United States Patent

[11] 3,596,177

[72] Inventor Emanuel Victor Butera
Capitola, Calif.
[21] Appl No 823,088
[22] Filed May 8, 1969
[45] Patented July 27, 1971
[73] Assignee International Business Machines Corporation
Armonk, N.Y.

[54] ENERGY FIELD PROBE OF CONSISTENT ATTITUDE CAPABLE OF MOVING WITH THREE DEGREES OF FREEDOM
8 Claims, 3 Drawing Figs.

[52] U.S. Cl. ................................................. 324/72,
324/72.5, 324/158 P
[51] Int. Cl. ............................................ G01r 31/02
[50] Field of Search............................................ 324/72,
72.5, 149, 158 P, 51; 178/18—20; 340/324;
339/108 TP; 317/246

[56] References Cited
UNITED STATES PATENTS

| | | | |
|---|---|---|---|
| 1,881,457 | 10/1932 | Froeckman ................. | 324/53 |
| 2,512,879 | 6/1950 | Roggenstein ................. | 317/246 |
| 3,247,391 | 4/1966 | Ogle et al..................... | 250/239 |
| 3,334,236 | 8/1967 | Bacon ........................... | 250/227 |
| 3,369,175 | 2/1968 | Morris........................... | 324/51 |
| 3,376,551 | 4/1968 | Armbruster.................. | 178/18 |
| 3,447,074 | 5/1969 | Sower et al. .................. | 324/37 |

OTHER REFERENCES

Zaccaria, B; Probe Holding Assembly; IBM Tech. Discl. Bull., Vol. 7, No. 4 April 1965 pp. 1076— 1077 (Copy in 324-158P

*Primary Examiner*—Rudolph V. Rolinec
*Assistant Examiner*—R. J. Corcoran
*Attorneys*—Hanifin and Jancin and George R. Roush ABSTRACT: The accuracy of data obtained by coordinate determining systems associated with graphical displays is increased by an energy field probe of consistent attitude. An energy transducing device is arranged in a protruding truncated cone portion of a carrier mounted in an elongated barrel for movement in two degrees of freedom. The transducing device in the carrier then assumes a predetermined attitude with respect to the display coordinate determining system with little regard to the angle of attack of the barrel of the probe. The contact surface of the probe is slightly concave for insuring positive positioning on curved display surfaces such as the face of a cathode-ray tube. A laterally flexible switch rod member has a head of generally rectangular configuration mating in a recess in the carrier of complementary configuration restraining the carrier from rotating about the longitudinal axis of the barrel for preventing the fouling and breaking of electric conductors and centering the carrier in the barrel when the probe is idle. The switch rod operates a momentary push-pull electric switch which permits the carrier to move in a third degree of freedom and provide an indication that the probe is operative. The probe is applicable to both the sensing and the injecting of audio and radiofrequency electromagnetic and acoustic energy in correspondingly based coordinate determining systems. It is also applicable to a probe having an electrode for sensing the strength of an electrostatic field and to probes having one or more luminous energy sensors such as used in CRT display and optical projection systems. A pistol-griplike body depending from the barrel serves as a duct for electric leads to the associated apparatus and also carries electric amplifying circuit components and the like. Luminous energy pattern sensing probes have the photoresponsive devices arranged with respect to this depending body so that the probe is automatically oriented for the pattern within permissible tolerances. Combinations of luminous energy and electromagnetic energy and electrostatic energy transducers are suggested.

PATENTED JUL27 1971 3,596,177

INVENTOR.
E. VICTOR BUTERA

BY George E Roush
ATTORNEY 3,596,177

ENERGY FIELD PROBE OF CONSISTENT ATTITUDE CAPABLE OF MOVING WITH THREE DEGREES OF FREEDOM

The invention relates to the same general field of graphical display coordinate data determining art as that disclosed in the copending U.S. Pat. applications Ser. No. 735,019 of Robert A. Johnson and Ray N. Streckenrider and Ser. No. 735,018, thereafter issued on Aug. 12, 1969 as U.S. Pat. 3,461,454, of Ray N. Streckenrider, both filed on June 6, 1968 for "position Identifying Device," and Ser. No. 787,421 of Richard Dean Weir, filed on Dec. 26, 1968 for "Coordinate Data Determination System," all assigned to the International Business Machines Corporation. Reference to these U.S. Pat. applications will be helpful in the understanding of the background of this invention.

The invention relates to graphic displays used in conjunction with electronic computing and data processing systems for the determination of Cartesian and similar coordinates of random loci of points within a predetermined substantially planar area for use with digital systems, and it particularly pertains to probes for accurately establishing the field strength of energy at those points.

In the contemporary information handling art, attention is being directed to the use of graphic displays for exhibiting a large quantity of information in readily assimilated form for use in teaching and learning, engineering and technical designing, vehicular traffic detecting and controlling, and weather forecasting, for example. The development of this art has reached a level at which it is particularly desirable that data from such a display readily and accurately be reduced and reintroduced into an electronic information handling system, particularly a digital computing and/or data processing system. Such arrangements are described in the above-referenced copending U.S. Pat. Applications. Prior art approaches to this problem applied the principle of resistive and conductive grids and plates similar to those used in early telautograph systems. The grids were made either of fine wire or of transparent material which had sufficient conductivity for the purpose. The plates, in most cases, were coatings of transparent but conductive material. It has also been suggested that a map or similar display be placed on an opaque metallic plate having means for establishing an electric current gradient thereacross. Other systems are known for use with cathode-ray tube displays wherein a light sensitive probe is placed on the screen of the cathode-ray tube and a measure of the lock obtained by measuring the time between the beginning of the cathode-ray tube scan and the time it passes the probe. All of these systems mentioned are relatively expensive and most of them are complex except for the CRT-light probe arrangement which, however, is limited to the cathode-ray tube display only and therefore something less than desirable. In the copending U.S. Pat. application , Ser. No. 787,421 of R.D. Weir there is disclosed an ordinate determination system comprising a pair of elongated electromagnetic energy radiating elements spaced apart and parallel with respect to one another on opposite sides of the display. Alternating current of given frequency from a suitable generator is applied for radiating electromagnetic energy from the elements, at least in the area therebetween, effecting a null substantially midway between the elements. A probe tuned to the given frequency is inserted in the field to detect the difference in electromagnetic energy radiated from the radiating elements at any point intermediate thereof, and circuitry coupled to the probe is arranged for converting the difference in electromagnetic energy detected to an indication of the ordinants of the location of the point with respect to the radiating elements. In such arrangements, coarse data indications are had with simple energy sensing probes manually held in the energy field with ordinary care. As the requirements for data become finer and finer, the attitude of the probe with respect to the field in the plane of the display becomes more and more critical. The desired probe then must be designed to accommodate or control the attitude. Some prior probes have taken some aspects of the probe attitude into account. Examples of this prior art are to be found in the following U.S. Patents:

| 2,482,016 | 9/1949 | McCoy | 175—183 |
| 2,517,975 | 8/1950 | Chapin | 175—183 |
| 2,535,002 | 12/1950 | Weber | 200—51.07 |
| 3,134,099 | 5/1964 | Woo | 340—347 |
| 3,170,987 | 2/1965 | O'Brien | 178—18 |
| 3,316,486 | 4/1967 | Woods | 324—35 | and articles from the technical literature:

W. E. Triest, IBM Technical Disclosure Bulletin, "Light Pen Tracking System," Jan. 1965, PP. 692 –692.

B.A. zaccaria, IBM Technical DIsclosure Bulletin, "Probe Holding Assembly," Apr. 1965, PP. 1076—1077

According to the invention, the objects indirectly referred to hereinbefore an hose which will appear as the disclosure progresses are attained in an ordinate determining system associated with a graphical display over which a varying energy field is superimposed and a probe which automatically assumes a proper attitude in use. An energy transducing device is arranged in a carrier having a small flat, or preferably slightly concave, surface to be placed against the surface of the display by manually positioning a somewhat conventional probe barrel in which the carrier is moveably mounted. The carrier and one end of the barrel have complementary configurations wherein the nose of the carrier protrudes from the barrel a short distance and is free to move in two degrees of freedom more or less angularly. A flexible member internally of the barrel urges the carrier to the one end at which it is arranged. Preferably, the carrier is restrained from rotational movement about the longitudinal axis of the barrel, especially in a probe for sensing a pattern of energy. Complementary configurations of a recess in the carrier and a head on the flexible member are suggested with the flexible member fastened to the barrel insofar as rotational movement is concerned. For probes having electric circuit devices to be operated in conjunction with the sensing of energy, such as an electric switch for indicating probe operation, the flexible member is attached to the device permitting the carrier to move in a third degree of freedom for actuating the drive, usually along the longitudinal axis of the barrel.

Probes according to the invention are capable of both sensing the presence of energy or injecting energy in the field about the display for systems using electromagnetic and/or acoustic energy fields. Probes for electrostatic and/or luminous energy are confined to the sensing of fields of energy but they are also applicable to the charging of capacitive elements and direction of light beams.

Pattern sensing is contemplated by arranging a plurality of energy transducing devices in the carrier in a pattern predetermined by the pattern of the energy to be sensed. The necessary orientation for nonconcentric patterns is obtained by a pistol-griplike body depending from the probe barrel and resting in the palm of the hand. This depending body also provides a conduit for the electric wires to the associated apparatus and space for a number of electric components or otherwise acting on the energy sensed or to be injected.

In order that the advantages of the invention may be readily attained in practice, a description of a preferred embodiment of the invention is given hereafter, by way of example only, with reference to the accompanying drawing, forming a part of the specification and in which.

Figure 1:
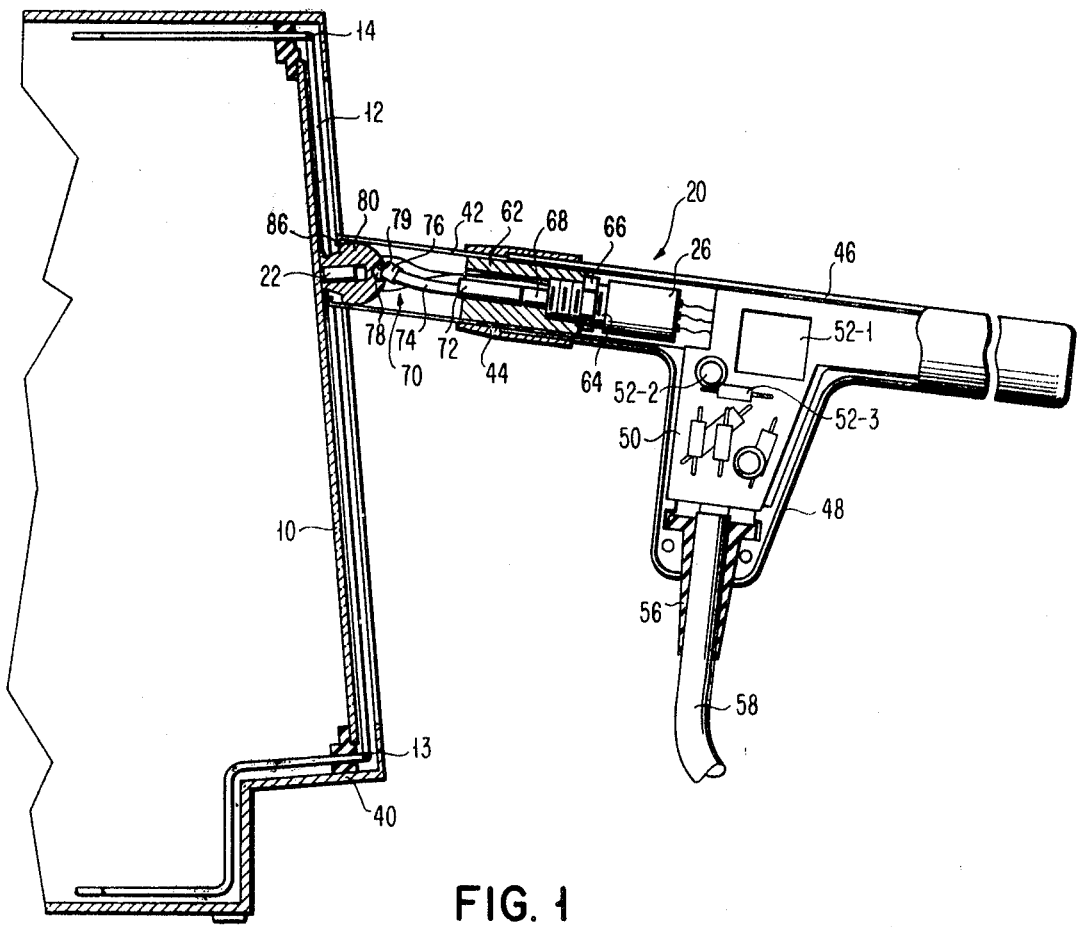
FIG. 1 is an illustration of a probe according to the invention in operation.

The essential elements of one coordinate data determination system for which a probe according to the invention is useful are depicted in the diagram of FIG. 1. The system is described in detail in the copending U.S. Pat. application No. 787,421 above mentioned. A graphic display (not shown) bearing the information with reference to which the coordinates are desired (for example, the coordinates of a point on a map) is projected onto a display screen 10. Four linear wire elements are arranged about the extremities of the screen 10 in a plane close to the front surface of the screen 10. The vertically extending element 12 is arranged for radiating a horizontal field. The horizontally extending elements 13 and 14 are connected to an alternating current generator of conventional form for the radiation of electromagnetic energy in the vertical direction in such opposing phase relationship that a null is provided substantially midway of the screen 10 substantially along a horizontal line parallel thereto. An analog value of electric current measuring the location of a point say on a horizontally extending line on the face of the screen 10 with respect to the null line is obtained by means of an electromagnetic energy probe 20 having a transducing device 22 tuned to the frequency of the electromagnetic field for detecting the difference in the electromagnetic energy radiated from the radiating elements 13 and 14. Maximum pickup is obtained with an inductor having direct inductance and interwinding capacitance of values resonating at or near the frequency of the magnetic field. Preferably, the probe 20 also incorporates a switch 26 arranged to render this determination effective only when the probe is pressed against the screen 10 at the point at which a determination is desired. SImilarly, an analog value of an ordinate in the horizontal direction away from a vertical null line is obtained by measuring the difference in electromagnetic energy radiated between the horizontally extending radiators. The fields of radiated energy are confined by casing 40 of material effectively blocking radiation of the energy to a virtual plane or, a very thin volume defined by the front surface of the screen 10 and the foremost extending part of the cabinet 40. The generators of the horizontal and vertical fields may be tuned to different frequencies in which case the transducer 22 of the probe 20 must be of more complex form in order to respond to two different frequencies. Another alternative solution is for one generator to generate a harmonic of the frequency of the other generator, however, the reliable distinction between harmonics is frequently more difficult and more expensive in embodiment than other methods of distinguishing the energy between the horizontal and vertical radiating elements. As thus far described, a conventional probe may be used if care is taken to insure the maximum or at least uniform pickup of the energy by the transducer.

Figure 2:
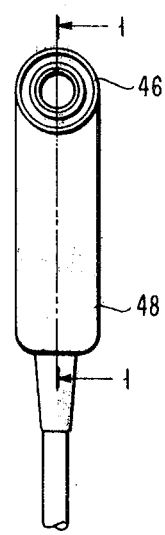
FIG. 2 is a front view of the probe according to the invention.
Figure 3:
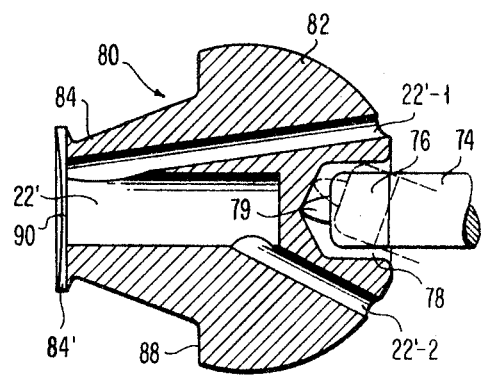
FIG. 3 is a cross section view looking down on a carrier according to the invention.

According to the invention, a uniform attitude for maximum pickup of energy by a transducer obtains from the probe 20 shown in FIGS. 1, 2, and 3. This probe 20 retains the advantages of balance and directivity so desirable in a probe with a tubular barrel. A tube 42 fits in a sleeve 44 which couples it to a casing having a handheld tubular portion 46 on the underside of which there is a depending body portion 48. The casing is preferably made in almost symmetrical halves with mating surfaces of complementary configuration. This method of manufacture makes for easy insertion and inspection of a circuit board 50 held between the two halves and on which electric components 52–n are mounted on both sides. In the lower portion of the depending body 48, there is a garment 56 through which a multiconductor electric cord 58 passes for connection to the associated image displaying and/or computing circuitry. The electric circuit terminals of the switch 26 are wired to the circuit board 50 in conventional form.

The switch 26, mounted in a sleeve 62 as shown in FIG. 1, is of conventional momentary push-pull construction having a threaded neck 64 on which there is a locknut 66 and in which there is a plunger 68. The sleeve 62 is partly in the tubular portion 46 of the casing and extends partly into the tube 42. The switch 26 and the sleeve 62 are mounted rigidly in the tubular portion 46 so that neither rotates or moves axially. The switch 26 can be adjusted by threading into or out of the sleeve 62 and fastened rigidly by the locknut 66. A flexible push rod member 70 comprises a butt 72, a flexible stem 74 and a head 76. The but 72 is keyed to the sleeve 62 so that the flexible member 74 is also restrained from rotational movement without being restrained from bending or flexing in any direction transverse to the axis of the tube 42. The head 76 is of configuration complementary to a recess 78 in a carrier 80. In general, the head 76 and the recess 78 are of a rectangular parallel piped configuration with spacing such that the carrier 80 is also prevented from rotation about the axis of the tube 42 while permitting angular displacement on the order of 20 percent to either side. The head 76 may be cubical or of other configuration, preferably much wider in one direction than in the other for preventing rotational movement. The interiormost part of the recess 78 is generally conical so that a tip 79 on the head 76 provides a finer action between the flexible member 70 and the carrier 80 and maintains the spacing between the carrier 80 and the switch plunger 68.

FIG. 3 illustrates the construction of the carrier 80 internally whereby a bore 22' of cylindrical configuration accommodates many commercially available energy transducing devices. Two smaller bores 22'-1 and 22'-2 lead from the transducer cavity 22' to the portion of the carrier 80 internally of the tube 42 for carrying the electric conductors necessary for the transducer. While two bores are shown, it is obvious that a greater number of bores may be provided for transducers having a greater number of electric conductors to be accommodated.

The carrier 80 may comprise a plurality of parts but preferably is made of an integral molded construction comprising a spherical portion and a conical portion. THe spherical portion is contained completely within the tube 42 and the conical portion is arranged to protrude through the end of the tube 42 which has a configuration retaining the carrier 80 within the tube 42. The carrier 80 may have a substantially completely spherical portion and the tube 42 may have fillets in the outer end confining the carrier to rotation about the center of the spherical portion. The carrier in this sort of configuration will be detented centrally of the tube 42 by the flexible member 74 particularly by action of the tip 79 of the head 76 on the flexible member 70. Preferably, however, the carrier 80 is designed as shown with a hemispherical portion 82 and a frustoconical portion 84 of such dimensions leaving an annular shoulder 88 which is urged normally against the lip 86 of the tube 42. In this manner, a positive detent is provided by the urging of the carrier 80 forward in response to the flexible member 70. In those arrangements wherein a switch 26 is not necessary, the carrier 80 need not have a recess 78 and the flexible member 70 may be replaced by a simple compression coil spring bearing against the sleeve 62 and urging the carrier 80 forward against a lip 86.

The carrier 80 is preferably expanded at the nose by a lip defining the outer edge of a faceplate surface 90 which is made slightly concave for those probes designed for application to a curved surface such as the face of a cathode-ray tube in display. For a capacitive pickup probe, the face plate primarily will comprise a metal capacitor plate 84' but a dielectric coating may be placed on the outer surface. A plate 84' of ruby or similar material is preferably used in those probes designed for use with a tubular ceramic acoustic wave transducer to prevent wear on the transducer.

In operation, the probe 20 is aimed at the screen 10 at any convenient angle of attack. Normally, the probe 20 is held between the thumb and index finger of the hand with the griplike depending portion 48 in the palm of the hand but not particularly gripped thereby. On touching the screen 10, the carrier 80 will move away from the normal position in either or both of the vertical and horizontal directions without rotating about the axis of the tube 42 until the faceplate surface 90 rests firmly on the screen 10. In this manner, the transducer 22 will always be positioned with the same attitude providing maximum transfer of energy. FUrther pressure on the probe toward the screen 10 will cause the carrier 80 and the flexible member 70, no matter how the latter is flexed, to move to the rear of the tube 42 and actuate the switch plunger 68.

In some instances, the probe 20, according to the invention may be used to sense a light pattern on the display screen 10. In such instances, the carrier 80 is fitted with a plurality of light sensors arranged in the predetermined pattern (there may be one light sensor in the center or not, as desired) and oriented with respect to the depending body portion 48 of the casing. Sufficient control of the orientation of the pattern of the transducer with respect to the pattern on the display screen 10 is afforded by the depending portion 48 as a guide.

Combinations of transducers may be mounted in the carrier 80 also according to the invention. For example, an audiofrequency or a radiofrequency transducer may be mounted centrally and surrounded by a plurality of light sensors for sensing or injection RF or AF energy into the coordinate system and sensing the presence of light either in a predetermined pattern or in some case merely the presence or absence of light of the screen 10. Acoustic energy transducers also may be used with light sensors for example. A capacitor plate may be perforated to permit light to pass to one or more light sensors. Any given transducer arranged in the carrier 80 may be used to inject energy into the system or to sense energy already present in the system. The copending U.S. Pat. applications Ser. Nos. 735,018 and 735,019 describe systems of the type calling for injection of energy, for example.

The invention I claim is:

1. An energy field probe for sensing energy at a point on a surface element with respect to which a field of energy is directed, comprising an elongated barrel and a transducer carrier movably mounted within and having a portion protruding from one end of said barrel at least one energy transducer device fixed in said transducer carrier to move therewith and having at least one electric conductor running emerging from said transducer carrier and within said barrel, said barrel and said transducer carrier having complementary configurations retaining said transducer carrier in said one end of said barrel and permitting said transducer carrier to move with two degrees of freedom within said barrel, an electric circuit device fixed in place within said barrel at a location removed from said transducer carrier and having at least two electric leads and an actuating element movable in a direction parallel to the longitudinal axis of said barrel, an elongated laterally flexible member arranged within said barrel and coupled between said transducer carrier said electric device.

said flexible member being of such length that said transducer carrier is urged in place toward said one end of said barrel, one end of said flexible member being fixed to said actuating element of said electric device for shifting the same longitudinally without rotation, said transducer carrier having a recess of substantially rectangular configuration facing the other end of said flexible member and said flexible member having a head at said other end of substantially rectangular and complementary splined configuration loosely mating with said recess for restraining said transducer carrier from rotational movement about the longitudinal axis of said barrel, thereby avoiding fouling of said electric conductor and permitting said transducer carrier when pressed against said surface element to move in a third degree of freedom for actuting said electric circuit device and for effecting the predetermined attitude of said transducing device in the use of the probe with respect to said field energy directed surface element.

2. An energy field probe as defined in claim 1 and wherein said electric circuit device is a switch.

3. An energy field probe as defined in claim 1 and wherein said transducing device is a radiant electromagnetic energy transducer.

4. An energy field probe as defined in claim 1 and wherein said transducing device is an acoustical wave energy transducer.

5. An energy field probe as defined in claim 1 and wherein said transducing device is an electrostatic energy electrode.

6. An energy field probe as defined in claim 1 and wherein said transducing device is luminous energy sensor.

7. An energy field probe as defined in claim 1 and wherein a griplike body is attached to and depends from said barrel at location intermediate the ends of the barrel and electric circuit components mounted on at least one circuit board are arranged in said barrel and griplike body.

8. An energy field probe as defined in claim 7 and wherein a plurality of luminous energy sensors are arranged in a predetermined pattern with respect to said one electric transducing device, and said pattern is oriented with respect to said griplike body for alignment in the operation of the probe.